United States Patent [19]

Stenzel

[11] 4,093,856

[45] June 6, 1978

[54] METHOD OF AND APPARATUS FOR THE ELECTROSTATIC EXCITATION OF IONS

[75] Inventor: Reiner L. Stenzel, Pacific Palisades, Calif.

[73] Assignee: TRW Inc., Redondo Beach, Calif.

[21] Appl. No.: 694,492

[22] Filed: Jun. 9, 1976

[51] Int. Cl.² ..................... B01D 59/44; H01J 39/34
[52] U.S. Cl. .................................. 250/293; 250/290; 250/282
[58] Field of Search ............... 250/251, 281, 282, 283, 250/290, 292, 293, 296, 299

[56] References Cited

U.S. PATENT DOCUMENTS

| | | | |
|---|---|---|---|
| 2,570,158 | 10/1951 | Schissel | 250/282 |
| 2,582,216 | 1/1952 | Koppius | 250/282 |
| 3,845,300 | 10/1974 | Roehling et al. | 250/282 |

*Primary Examiner*—Bruce C. Anderson
*Attorney, Agent, or Firm*—Edwin A. Oser

[57] ABSTRACT

A selected isotope of an element may be caused to acquire more energy than other isotopes by generating a plasma in a magnetic field and electrically exciting the selected isotope at its resonant frequency. Instead of exciting the desired ion by a variable magnetic field, this is effected by electrostatic excitation. A segmented anode is disposed in the plasma at right angles to the longitudinal axis of the device. Each segment of the anode has applied thereto a voltage varying at desired resonant frequency of the selected isotope so that each segment has a different alternating potential. The potential between the cathode and the anode is a steady dc potential to generate the plasma.

15 Claims, 8 Drawing Figures

U.S. Patent  June 6, 1978  Sheet 1 of 3  4,093,856
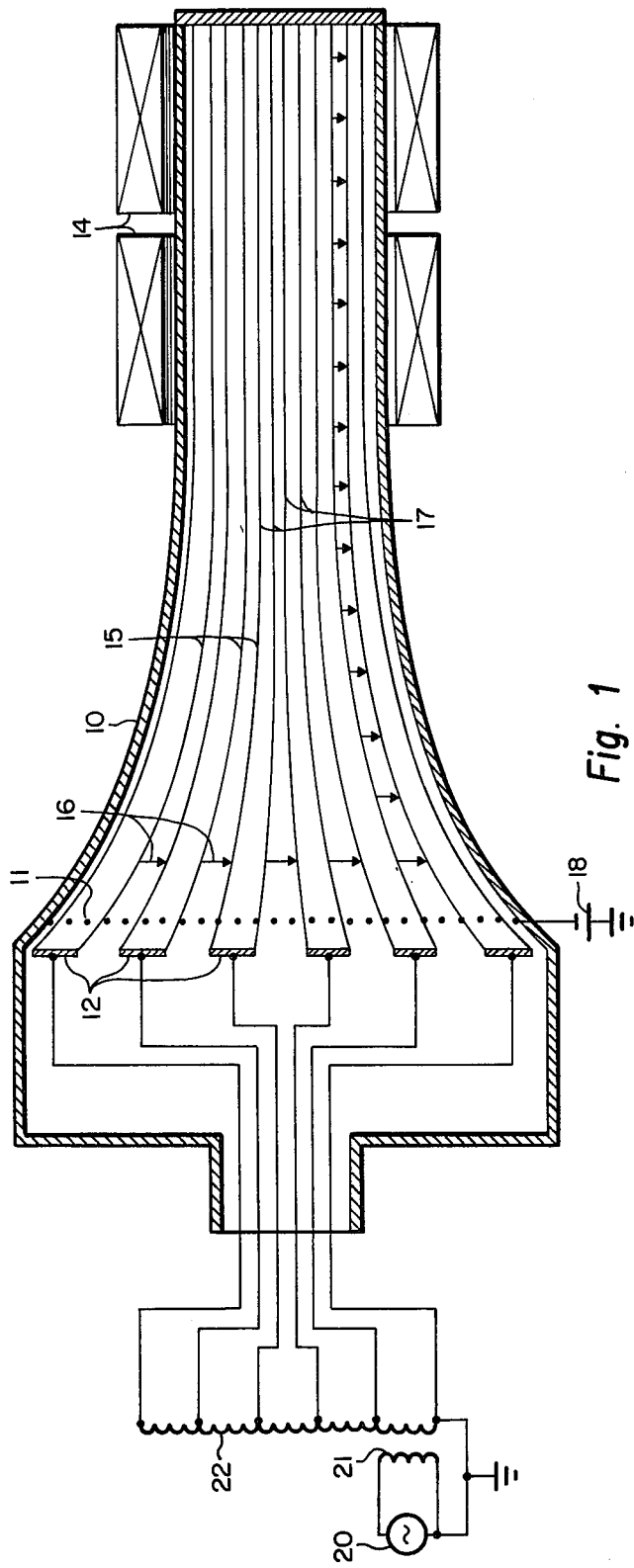
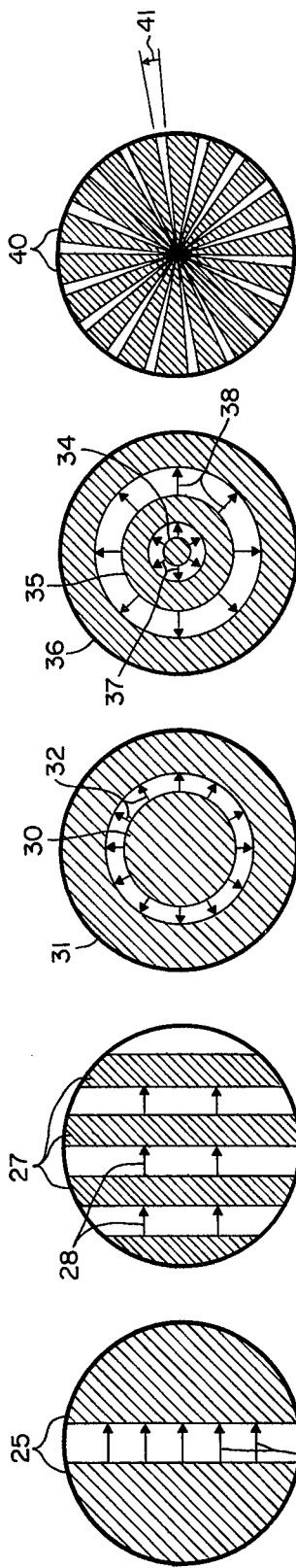

METHOD OF AND APPARATUS FOR THE ELECTROSTATIC EXCITATION OF IONS

CROSS REFERENCE TO RELATED APPLICATION

This invention may be considered to be an improvement over the prior application to John M. Dawson entitled "Method of and Apparatus for the Separation of Isotopes" filed on Mar. 27, 1975, Ser. No. 562,993 now abandoned.

BACKGROUND OF THE INVENTION

This invention relates generally to the separation of isotopes from each other and particularly relates to the electrostatic excitation of a desired isotope in a substantially electrically neutral, dense plasma.

The Dawson application above referred to relates to a method of and apparatus for separating isotopes in a dense plasma. This is accomplished by exciting a desired isotope so that more energy is imparted to it than to the other isotopes. To this end a steady magnetic field is generated in the plasma. Furthermore, a variable magnetic field is also generated which in turn provides a variable electric field at the resonant frequency of the desired isotope.

It has been found that the generation of an oscillating magnetic field by a suitable coil requires a relatively large energy. This is primarily due to the losses of current in the coil. It would, therefore, be desirable to generate the electric field by means of an anode to which the alternating electric field is directly applied. However, difficulties have been experienced in the past in an attempt to generate by an electric voltage an electric field in a plasma immersed in a steady magnetic field.

It is accordingly an object of the present invention to provide a method of and apparatus for preferentially exciting one isotope of an element over other isotopes by electrostatically exciting the ion.

A further object of the present invention is to provide apparatus of the type discussed which requires substantially less energy and can be successfully practiced in a desired plasma immersed in a steady magnetic field.

SUMMARY OF THE INVENTION

In accordance with the present invention there is provided apparatus for selectively imparting more energy to a selected one of the isotopes of an element in a plasma.

The apparatus comprises an elongated evacuated container having a central axis. Means is provided for generating in the container a dense, substantially electrically neutral, and substantially collissionless plasma. The plasma includes ions of an element having at least two isotopes. Means are provided for generating a steady magnetic field within the container, along the axis and through the plasma. A cathode and an anode is disposed in the container.

Further in accordance with the present invention the anode is disposed substantially at right angles to the longitudinal axis and consists of at least two separate spaced sections. Finally, means are provided for applying an alternating electric voltage to each section of the anode so that there is a potential difference between the electric voltage applied to each section. The frequency of the alternating voltage applied to the anode corresponds to the resonant frequency of the selected isotope as disclosed and claimed in the Dawson application previously referred to. As a result a varying electric field is applied to the plasma for imparting more energy to the desired ionized isotope than to other ions.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWINGS

FIG. 1 is a schematic sectional view of apparatus in accordance with the present invention for electrostatically exciting a desired ionized isotope;

FIGS. 2 through 6 are plan views of different embodiments of anodes which may be used with the apparatus of FIG. 1 in accordance with the present invention;

DESCRIPTION OF THE PREFERRED EMBODIMENTS

Figure 7:
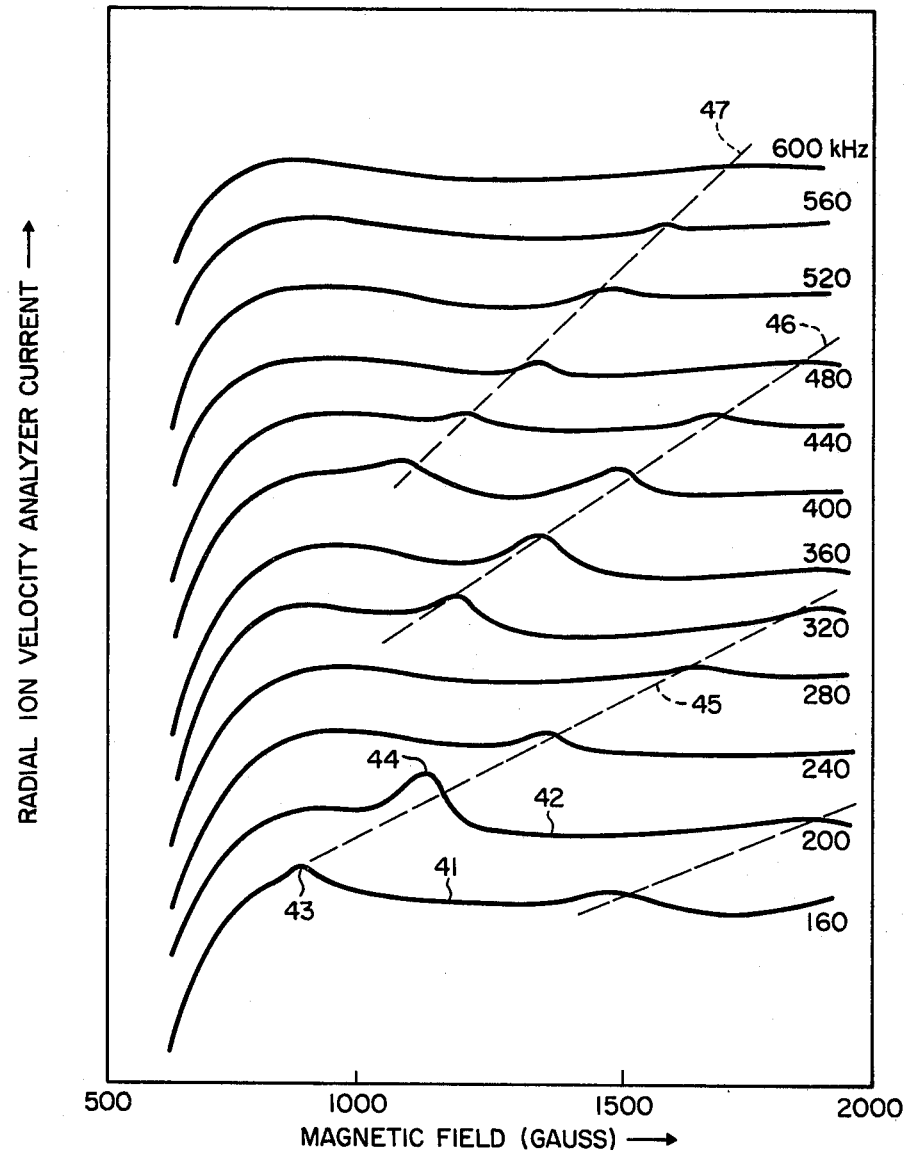
FIG. 7 is a graph plotting the radial ion velocity analyzer current as a function of the magnetic field which has been measured with the apparatus of FIG. 1 and showing a family of curves for different resonate frequencies.

Referring now to the drawings and particularly to FIG. 1, there is illustrated a schematic sectional view of apparatus embodying the present invention. The apparatus includes an evacuated elongated container 10 within which a plasma is generated and maintained. The plasma should be relatively dense and, of course, electrically neutral. In other words, the plasma should have a substantially equal number of positive and negative particles such as ions and electrons. Thus, the total number $n$ of particles may be between $10^{11}$ and $10^{13}$ particles per cubic centimeter. The number of charged particles such as $n_e$ (the number of electrons or ions) per cu. centimeter should be $10^9$ to $10^{10}$. This corresponds to a pressure of approximately $3 \times 10^{-6}$ and $3 \times 10^{-4}$ torr. This defines a medium to dense plasma.

In addition, the plasma should be substantially collisionless. This depends on the path length of the particles which is defined as follows:

$$l = V_e/f_{col} \qquad (1)$$

where $V_e$ (in cm/sec) is the velocity of the electrons, while $f_{col}$ is the number of collisions per second. In other words, this means that the mean free path of the electron is larger than the machine length and hence the name collisionless plasma.

The plasma may be generated in any conventional manner, some of which have been pointed out in the Dawson application previously referred to. Preferably, however, the plasma is made by a filamentary cathode 11 and anode 12 consisting of a plurality of sections physically separated from each other and hence electrically insulated from each other. This cathode 11 may, for example, be a multifilament cathode to permit the plasma to pass therethrough. The construction of such a cathode has been disclosed in a paper by Gekelman and the Applicant entitled "Large, Quiescent, Magnetized Plasma for Wave Studies" which appears in the Review of Scientific Instruments, Vol. 46, No. 10, October 1975, pages 1386 - 1393 (see particularly page 1386 - 1388).

In such a collisionless plasma the plasma potential differs from the anode potential by only a small sheath potential drop which is defined as follows:

$$3 kT_e/e \qquad (2)$$

In this formula $k$ is Boltzmann's constant; $T_e$ is the electron temperature and $e$ is the charge of the electron. This is true assuming that the anode 12 is the dominant surface on which plasma is lost by recombination. The sheath acts to repel electrons to balance the loss rate of the electrons which are highly mobile and the ions which are slower. In such a plasma which is unmagnetized, the plasma potential is constant throughout the volume due to the high electron mobility.

A magnetic field is established within the container 10 by a pair of magnetic coils 14 surrounding the right-hand cylindrical portion of the container 10. The resulting magnetic field having magnetic field lines 15 which is established in the container 10 greatly reduces the electron mobility across the field lines 15 in a direction shown by arrows 16. However, it does not reduce electron mobility along the field lines 15. This effect now makes it possible in accordance with the present invention to establish different plasma potentials on different flux tubes such as shown at 17. However, it does not reduce electron mobility along the field lines 15. This effect now makes it possible in accordance with the present invention to establish different plasma potentials on different flux tubes such as shown at 17.

A direct current potential is applied between cathode 11 and anode 12 by grounding the anode sections 12 and applying a negative voltage from battery 18 to the cathode filament 11. Further in accordance with the present invention an alternating electric voltage is applied to each one of the individual anode sections 12. This may be accomplished by a generator 20 having one terminal grounded and connected across the primary winding 21 of a transformer having a secondary winding 22 which is grounded as shown. Portions of the secondary winding 22 are connected by suitable taps to adjacent ones of the anode sections 12 so that an alternating voltage is applied to each anode section. Each anode section has a potential which differs by an equal amount from the potential applied to its adjacent sections. Under the conditions previously outlined, a proportional potential difference is established in the plasma across adjacent flux tubes 17.

In the presence of a steady electric voltage the response of the electrically charged particles is a drift motion proportional to:

$$\underline{E} \times \underline{B},$$

where $\underline{E}$ is the vector of the electric field and $\underline{B}$ the vector of the magnetic field.

However, as the potential applied to the anode sections oscillates the drift motion of the ions and electrons also oscillates. The frequency is selected to correspond to the resonant frequency of the desired isotope. In that case, the ion cyclotron motion of the selected isotope is enhanced by resonance. This in turn means that the desired isotope acquires more energy than the other ions. Isotope separation can now be accomplished, for example, in the various ways outlined in the Dawson application previously referred to. It should also be noted that the electron transit time in the device should be short compared to the period of the applied alternating electric field.

While the plasma may be generated in any conventional manner, it is preferred in accordance with the present invention to generate the plasma by the applied direct current potential between the filamentary cathode 11 and the segmented anode 12. All sections of the anode 12 are grounded by grounding the secondary winding 22. How the plasma is generated has been outlined in the paper previously referred to by Gekelman and Stenzel. This is preferably carried out in a region of the container 10 having a weak magnetic field. To this end cathode 11 and anode 12 are preferably located away from the coils 14 so that the magnetic field lines are divergent. In this region the magnetic field is many times smaller than toward the right of the container 10.

In this weak magnetic field region energetic primary electrons are produced by the cathode 11. Depending on their direction they may be attracted by the anode 12, in which case they generate an electric current between cathode and anode. On their path they will collide with atoms or molecules to create ions. In this manner a dense plasma can be generated. Preferably, cathode 11 and anode 12 are positioned clearly adjacent to each other. Preferably the distance between cathode and anode is 5 centimeters. This in turn will minimize plasma instability and reduce noise.

It should be noted that while the plasma has been shown to be generated within the magnetic field, it is also feasible to generate the plasma outside the magnetic field and then introduce it into the magnetic field.

Much less power is required to impress the electric field as shown in accordance with the invention to FIG. 1 than by utilizing an oscillating magnetic field as disclose, for example, in the Dawson application. One reason is that the magnetic coils are rather lossy. Another reason is that the alternating currents in the plasma are mainly reactive rather than resistive.

It will be realized that a more uniform electric field can be generated by utilizing a large number of anode sections. Also, the anode sections can be made in different geometric configurations which will now be explained in connection with FIGS. 2 - 6. FIG. 2 illustrates two anode sections 25 of substantially semicircular shape which are shaped from each other. The electric field lines 26 extend in a horizontal direction; but by rotating the anode structure through 90° a vertical electric field can be achieved. Another anode structure consisting of a plurality of spaced sections has been illustrated in FIG. 3. Here the anode sections 27 are parallel to each other and substantially fill a circular space. The field lines again are shown at 28 and extend in a horizontal direction. This structure corresponds to the anode 12 of FIG. 1.

It is also feasible to provide a radial electric field. This can be accomplished with the anodes illustrated in FIGS. 4 and 5. FIG. 4 shows a central circular anode 30 and a spaced annular anode 31 providing radial field lines 32. The anode of FIG. 5 has a small central circular anode section 34 and two concentric annular sections 35 and 36 generating a plurality of radial field lines 37 and 38.

It is also feasible to provide a field in an azimuthal direction. This has been illustrated in FIG. 6. This is accomplished by a plurality of radial anode sections 40. The field lines 41 extend along concentric circles.

Figure 8:
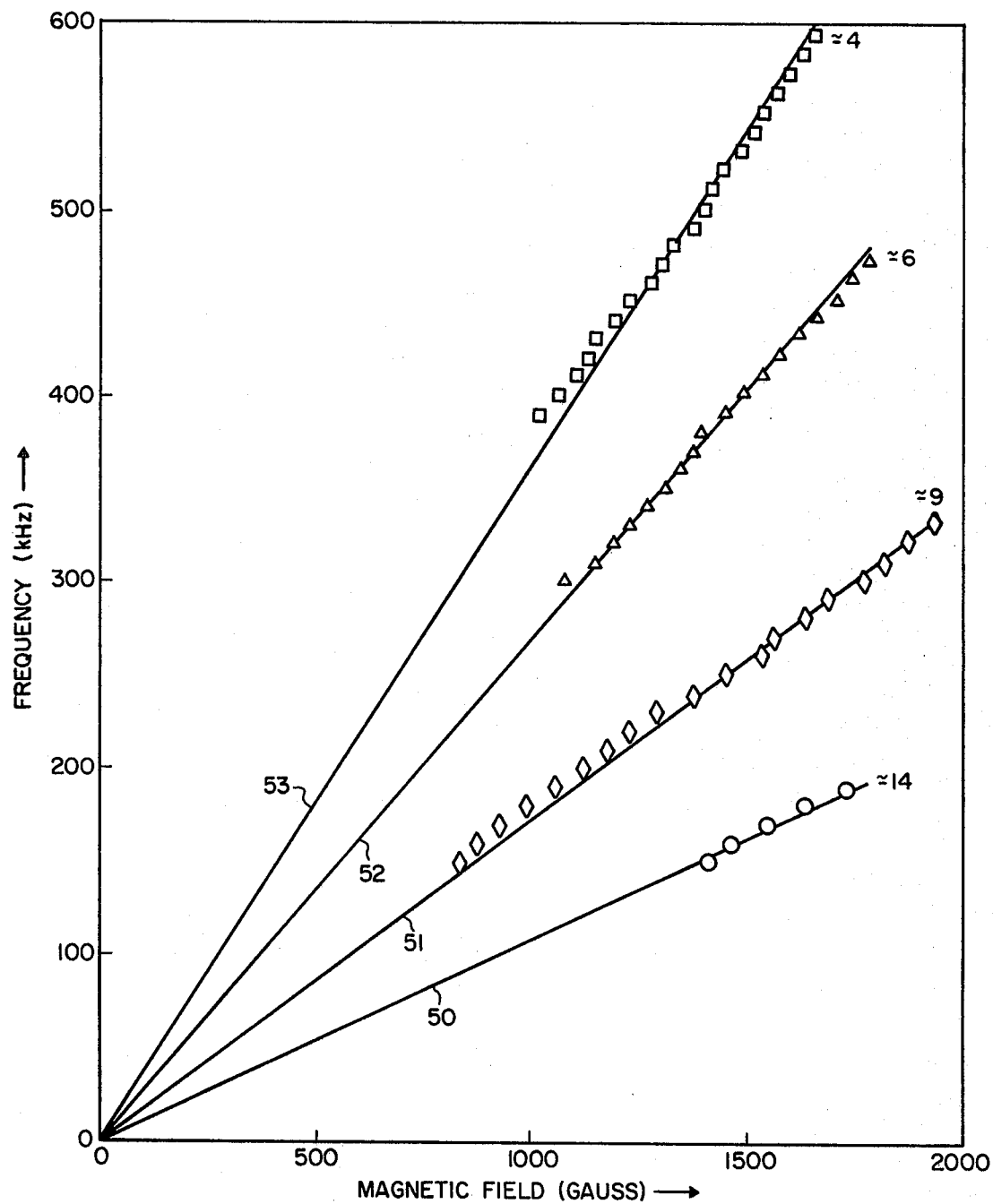
FIG. 8 is a graph of the frequency as a function of the magnetic field and showing a plurality of straight lines which have been derived from the curves of FIG. 7 and showing the excitation of certain ions with the apparatus of FIG. 1.

Measurements have been carried out with the apparatus of FIG. 1. The plasma is created by a direct current discharge in argon having a pressure of $10^{-5}$ to $10^{-3}$ Torr. The magnetic field strength near the cathode is 60 gauss and the uniform magnetic field is 1000 gauss. A family of straight lines 50, 51, 52 and 53 is shown passing through the origin and corresponding to the mass of the ion compared to the mass of the proton. These masses correspond respectively to 14, 9, 6 and 4, approximately. These masses may correspond respectively to the following ions: $N+$, $O++$, $C++$ and $He+$. Thus if the resonance which depends both on the magnetic field and the frequency of the alternating voltage applied to the anode corresponds to a particular species of ion, the unknown ion mass can be determined from the slopes of the lines of FIG. 8. It should be emphasized that only the helium and nitrogen masses are clearly identified. However, it is assumed that the intermediate resonances correspond to doubly ionized oxygen and carbon ions. However, they may also correspond to other ion-ion hybrid resonances.

There has thus been disclosed a method of and apparatus for the electrostatic excitation of ions. The ions are contained in a dense, substantially electrically neutral and substantially collisionless plasma in the presence of a magnetic field. It has been explained how an alternating electric field can be introduced in the plasma along adjacent flux tubes. This in turn makes it possible to differentially excite the ions of one isotope with respect to the ions of the other isotopes with less expenditure of energy and with the minimum of structure in the plasma tube. The anode used for this purpose may be necessary in any case for the generation of the plasma. The results obtained have been plotted by the graphs of FIGS. 7 and 8.

What is claimed is:

1. Apparatus for imparting more energy to a selected one of the isotopes of an element in a plasma, said apparatus comprising:
   (a) an elongated evacuated container having a central axis;
   (b) means for generating in said container a dense, substantially electrically neutral, and substantially collisionless plasma including ions of an element having at least two isotopes;
   (c) means for generating a steady magnetic field within said container, along said axis and through said plasma;
   (d) a cathode and an anode in said container;
   (e) said anode being disposed substantially at right angles to said longitudinal axis and consisting of at least two separate spaced sections; and
   (f) means for applying a different alternating electric voltage to each section of said anode, the frequency of the alternating voltage applied to said anode corresponding to the resonant frequency of the selected isotope, whereby a varying electric field is applied to the plasma for imparting more energy to the selected ionized isotope than to other ions.

2. Apparatus as defined in claim 1 wherein said cathode is disposed adjacent to said anode, said cathode consisting of filaments and means for applying a direct current potential between said cathode and said anode for accelerating electrons toward said anode, whereby said cathode and anode provide the means for generating the plasma.

3. Apparatus as defined in claim 2 wherein said means for generating a magnetic field generates a field within a portion only of said container to provide diverging magnetic field lines, said cathode and anode being disposed in the region having diverging field lines.

4. Apparatus as defined in claim 1 wherein the length of said container is such that the electron transit time of primary electrons along said central axis is less than the period of the alternating electric voltage.

5. Apparatus as defined in claim 1 wherein said anode consists of a plurality of spaced sections.

6. Apparatus as defined in claim 1 wherein said anode includes two substantially semicircular, spaced sections.

7. Apparatus as defined in claim 1 wherein said anode consists of a plurality of sections disposed parallel to each other, spaced from each other and substantially filling a circular space.

8. Apparatus as defined in claim 1 wherein said anode consists of a central circular section and a surrounding annular section spaced therefrom, and wherein the electric alternating voltage applied to one section is opposite in phase to that of the other sections.

9. Apparatus as defined in claim 1 wherein said anode consists of a plurality of sections including a central circular section and a plurality of annular sections, said sections being spaced from each other, and wherein the amplitude of the alternating electric voltage applied to a section differs from that of an adjacent section.

10. Apparatus as defined in claim 1 wherein said anode consists of a plurality of radial sections spaced from each other by radial interstices, and wherein the amplitude of the alternating electric voltage applied to a section differs from that of an adjacent section.

11. The method of imparting more energy to a selected isotope of an element in a plasma which comprises the steps of:
   (a) generating a dense, substantially electrically neutral, and substantially collisionless plasma including an element having at least two ionized isotopes to be separated;
   (b) generating a steady magnetic field along a central axis;
   (c) disposing a segmented electrode in a plane substantially at right angles to the central axis and in said plasma; and
   (d) applying a varying electric voltage to each segment of the segmented anode so that there is a voltage difference between each segment and an adjacent segment, the frequency of the alternating electric voltage corresponding to the resonant frequency of the selected isotope, whereby the resultant alternating electric field in the plasma imparts more energy to the selected ionized isotope than to other ions.

12. The method defined in claim 11 wherein the steady magnetic field is generated only along a portion of the central axis, whereby diverging magnetic field lines are generated in a direction away from the steady magnetic field and wherein the plasma is generated in the region of the diverging magnetic field lines.

13. The method defined in claim 12 wherein the plasma is generated by providing a steady electric field between the segmented electrode forming an anode and a cathode disposed adjacent thereto for accelerating electrons toward the anode.

14. The method defined in claim 11 wherein the electron transit time of primary electrons along the central axis is short compared to the period of the alternating electric voltage.

15. Apparatus for imparting more energy to a selected one of the isotopes of an element in a plasma, said apparatus comprising:
(a) an elongated evacuated container having a longitudinal axis;
(b) means for generating in said container a dense, substantially electrically neutral, and substantially collisionless plasma including ions of an element having at least two isotopes;
(c) means for generating a steady magnetic field within said container, substantially parallel to said axis and through said plasma;
(d) an electrode consisting of at least two electrically independent and spaced sections disposed in a plane substantially normal to said axis; and
(e) means for applying a different alternating electric voltage to each of said sections, the frequency of the alternating voltage corresponding to the resonant frequency of the selected isotope, whereby a varying electric field is applied to the plasma for imparting more energy to the selected ionized isotope than to other ions.

* * * * *